United States Patent [19]

Alter et al.

[11] Patent Number: 4,518,860
[45] Date of Patent: May 21, 1985

[54] COMPACT DETECTOR FOR RADON AND RADON DAUGHTER PRODUCTS

[75] Inventors: H. Ward Alter, Walnut Creek; Richard A. Oswald, Benicia, both of Calif.

[73] Assignee: Terradex Corporation, Walnut Creek, Calif.

[21] Appl. No.: 435,197

[22] Filed: Oct. 19, 1982

[51] Int. Cl.³ ............................................. G01V 5/00
[52] U.S. Cl. .................. 250/253; 250/472.1
[58] Field of Search ............... 250/253.1, 472.1, 474.1

[56] References Cited

U.S. PATENT DOCUMENTS

| | | | |
|---|---|---|---|
| 3,505,523 | 4/1970 | Becker . | |
| 3,665,194 | 5/1972 | Alter et al. | 250/253 |
| 3,783,292 | 1/1974 | Alter et al. . | |
| 4,064,436 | 12/1977 | Ward | 250/253 |
| 4,338,523 | 7/1982 | Alter | 428/79 |
| 4,385,236 | 5/1983 | Hassib et al. | 250/472.1 |

FOREIGN PATENT DOCUMENTS 1331812 9/1973 United Kingdom .

*Primary Examiner*—Janice A. Howell
*Attorney, Agent, or Firm*—Townsend and Townsend

[57] ABSTRACT

A compact low cost track registration detector for radon gas and radon daughter products includes a housing with a removable closure cap for retaining a strip of track registration material having the property of forming damage tracks along paths traversed by alpha particles. The strip is retained within the housing by integrally formed upstanding ribs located closely adjacent diametrically opposite inner side wall portions of the housing, a first set of ribs forming a pedestal support and second set of longer ribs providing transverse support. A microporous filter impervious to particles and radon daughter products admits only radon gas to the interior of the housing. The apertured closure cap has a central solid portion providing a radiation shield for the upper surface of the strip to enable the lower exposure surface to be readily distinguished after the detector has been retrieved from an exposure site. The housing is fabricated from a pure polyethylene material free from any residual alpha particle radiation. A flexible strip wrapped about the exterior of the housing affords both a hanging strap and an information sheet for user entry of exposure information.

19 Claims, 4 Drawing Figures

COMPACT DETECTOR FOR RADON AND RADON DAUGHTER PRODUCTS

BACKGROUND OF THE INVENTION

This invention relates to an improved apparatus for the detection of radon gas using a track registration material.

A known technique employed in the field of radon gas detection which has been found to be highly effective is the method and apparatus for detecting radon and alpha emitting daughters of radon disclosed and claimed in U.S. Pat. No. 3,665,194 to Alter, et al. for "Radon Detection", the disclosure of which is hereby incorporated by reference. Briefly, according to this technique, a strip of track registration material employed as an alpha particle detector is disposed in a protective environment at a preselected location in order to monitor the presence of radon and alpha emitting daughters of radon. If the track registration material is irradiated by alpha particles falling within the sensitivity range of the track registration material, minute damage "tracks" are created therein, which tracks can be subsequently enlarged and made visible under suitable magnification by contact with a reagent to which the tracks display preferential chemical reactivity.

Typically, this radon monitoring technique is carried out by placing one or more housings, each containing a strip of track registration material, in locations to be monitored (such as a mine or a dwelling), and permitting the detectors to remain at the monitored site for a preselected period of time e.g. several weeks). After exposure, the housings are removed, each strip of track registration material is subjected to a chemical etching solution, and the number of tracks etched per unit area on each strip is counted by microscopic inspection. The thus-obtained track data is then used to compute the average radon concentration in the monitored site.

While the above-described technique has been primarily employed in the past for uranium prospecting applications, more recently this technique has been used to measure radon anomalies in earthquake prone areas, to measure radon levels in housing structures located in regions suspected of exhibiting abnormal levels of radon concentration, and as a personal dosimeter to measure the degree of exposure of personnel employed in the mining industry. The most popular track registration type detector employed in the past comprises a housing resembling a plastic drinking cup and a strip of track registration material adhered to the inside bottom surface of the cup at a prescribed distance away from the mouth of the cup, the distance being greater than the transit range of alpha particles in the atmosphere, so that the material is exposed to alpha particles emitted by only gaseous sources migrating into the interior of the housing. Since the range in air of radon-related alpha particles is typically no more than about 8.5 centimeters, this geometry imposes a minimum dimensional constraint on the size of the housing, which has impaired the suitability of such detectors for structural survey applications, particularly for rooms in dwellings and for personal dosimeter applications. Specifically, in structural survey applications the cup must be attached to a wall of the structure or suspended from the ceiling, each of which is at best awkward with a cup of minimum dimensions as noted. In addition, the adverse aesthetic effects inherent with the use of such a detector militate against their acceptability in household and office applications. In personal dosimeter applications, the housing is too large to be conveniently attached to the clothing of the user's, and thus must be incorporated into the users equipment, such as a mining helmet or the like.

As a result of the limitations noted above, recent efforts have been directed toward designing special track registration detectors dedicated to a particular application. For example, in commonly assigned U.S. Pat. No. 4,338,523 issued July 6, 1982, for "Low-Cost Track Registration Radiation Detector", a track registration detector is disclosed which is designed specifically for use in monitoring radon levels in interior structures, particularly personal dwellings. While this device is eminently suited for structural survey uses, use of the same device alone in ground survey applications would not yield useful results due to the physical proximity to sources of alpha emitting particles having energy within the susceptability range of the track registration material employed. Similarly, use of the device shown in the above-noted U.S. patent in personal dosimetry applications would require such precautionary measures to avoid closely adjacent sources of alpha radiation that it would be difficult to obtain reliable track registration data. Thus, a need has existed for a low cost track registration type alpha particle detector which can be used effectively and interchangeably in a wide variety of essentially different types of radon monitoring applications.

One impediment to the design of such a universal track registration type detector has been the conflicting dimensional constraints involved. On the one hand, structural survey and personal dosimeter applications require housings having extremely small size so as to be convenient to emplace on a wall or carry about the person; on the other hand, for most accurate results it has been thought necessary until recently to locate the track registration material in the housing at the minimum distance noted above (8.5 centimeters) from the nearest point of entry into the housing. In addition, the design philosophy has favored placement of the track registration material the same minimum separation distance away from surfaces on which alpha-emitting radon daughter products can plate out, in order to limit detection to alpha particles emanating from gaseous sources only. This additional minimum dimensional constraint has prevented the development of track registration detectors having the reliability and accuracy of standard cup size detectors, while at the same time having physical dimensions small enough to promote use of the detector in the personal dosimeter and structural survey applications.

One solution proposed to the above dilemma has been a relatively small radon diffusion chamber closed at the top by a fiberglass filter and containing two detector strips, one at the bottom of the chamber and another in front of the filter. The combination of the fiberglass filter and a special cover design theoretically traps all aerosols and radon daughter products so that only a gaseous mixture of radon/thoron diffuses through the filter and through holes in the perforated detector foil in the front of the detector into the sensitive inner volume of the chamber. In principle, the foil detectors principally register the alpha particles from radon decay products plated out on the surface of the chamber and also alpha particles present in the air which diffuses through the filter. By using preferential etching techniques, only alpha particles having energies between 0.5 and 2.0 MEV are detected.

While experimentally useful, the above proposed diffusion chamber suffers from several disadvantages. Firstly, the design requires careful assembly so that the detector foils are properly placed in special recesses in the conically shaped wall of the chamber. Secondly, the experimental diffusion chamber has no provision for mounting the device out of the reach of children so that it is subject to being tampered with, which would defeat the purpose of the detector. In addition, the foil detector is not only sensitive to alpha particles emanating from the gases which enter the interior volume and the radon daughter products produced within the volume, but also to alpha particles emitted by substances within the housing material itself.

SUMMARY OF THE INVENTION

The invention comprises an improved low cost compact track registeration detector of minimal size devoid of the above-noted disadvantages and suitable for use in an extremely wide range of applications.

The detector includes a housing having an open mouth, a bottom and side walls defining an interior volume in which a strip of track registration material is to be mounted. A first and second set of upstanding ribs molded into the side walls in the interior of the housing are dimensioned to provide longitudinal and lateral support for the strip of track registration material. A microporous filter positioned across the mouth of the housing prevents the entry of radon daughters and particulate matter into the housing interior so that substantially only gases enter the interior volume of the housing, the microporous filter preferably comprising a water repellent embossed laminate of microporous polypropylene material having a pore volume of about forty-five percent with pore sizes of about 0.04 by about 0.20 micrometer and a thickness of about 200 micrometers.

The microporous filter is retained across the mouth of the housing by means of a sturdy apertured cap removably received on the mouth end of the housing, preferably by a relatively stiff snap fit, the cap also serving to clamp the strip of track registration material on the support ribs against longitudinal and lateral movement.

The apertured cap includes a solid central portion which provides a radiation shield for the top surface of the track registration material to enable the exposed bottom surface of the track registration material to be readily distinguished prior to reading after exposure.

In order to minimize radiation "noise", the housing and cap are fabricated from a material substantially devoid of any alpha emitting substance, the preferred material comprising pure polyethylene.

In order to enhance the sensitivity of the track registration material to the radon gas and radon daughter products of interest, the track registration material preferably comprises a strip of solid material having an alpha particle sensitivity lying in the range of about 0.01 to about 8.0 MEV.

To facilitate the emplacement of the invention, a flexible strip of paper, tape or other suitable flexible material is secured at the base end and wrapped about the outer periphery of the detector housing, the flexible tape serving as a holder for the device when it is to be attached to a support surface (e.g. a wall). The strip is preferably preprinted with instructions for emplacement and spaces provided for the insertion of desired exposure data, such as installation data, installation site, removal data, etc.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
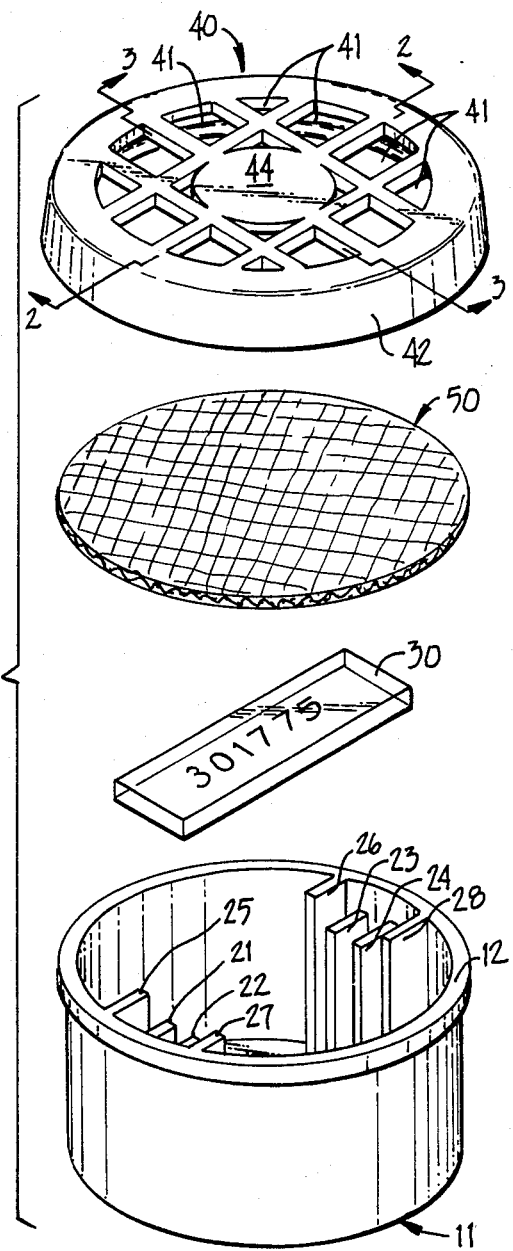
FIG. 1 is an exploded view of a preferred embodiment of the invention.

Turning now to the drawings, FIG. 1 illustrates in exploded perspective a preferred embodiment of the invention. As seen in this FIG., the invention comprises a main housing member 11 having right circular cylindrical geometry with an annular closure lip 12 extending about the upper periphery thereof. Located within the cylindrical volume of main housing 11 are four pairs of upstanding ribs, which are preferably integrally molded with main housing 11 at approximately diametrically opposite positions. Two pairs of ribs, viz. ribs 21, 22, 23 and 24 terminate in upper support surfaces: while the remaining pairs, viz. ribs 25, 26, 27 and 28 terminate in the same plane as the upper surface of the annular rim 12. Ribs 21–24 provide longitudinal support for a strip of track registration material 30, described below, while ribs 25–28 provide lateral support therefor. Ribs 21–28 also provide additional structural strength to the main housing 11 to resist distortion in both a vertical plane and a horizontal plane to protect the strip 30 against damage from external forces.

A closure cap 40 is provided with a plurality of apertures 41 and has a downwardly extending peripheral rim portion 42 terminating in an inwardly extending annular lug 43 (FIGS. 3 and 4) which cooperates with rim 12 to provide a snap fit closure.

Positioned across the mouth of housing 11 is a filter sheet 50, the rim portions of which are captured between rim 12 and lug 43 so that the filter sheet 25 is secured in place when the cap is attached. Filter sheet 25 is fabricated from a microporous filter material having sufficient pore density in size to admit radon gas but to block the passage therethrough of particulate material and radon daughter products from the environment external to the housing. A preferred filter material is a water repellent, embossed laminate of microporous polypropylene having a forty-five percent pore volume with 0.04 by 0.20 micrometer pores. The total thickneses of the preferred material is about 200 micrometers, which is greatly in excess of the 15–50 micrometer range of radon related alpha particles. The filter 50 and the positioning of the detector with respect to it ensures that any alpha particles present in the interior volume of main housing 11 which can reach the exposed underside of the track registration material 30 can only originate from gases admitted therein, or decayed products of constituents of such gases.

Figure 2:
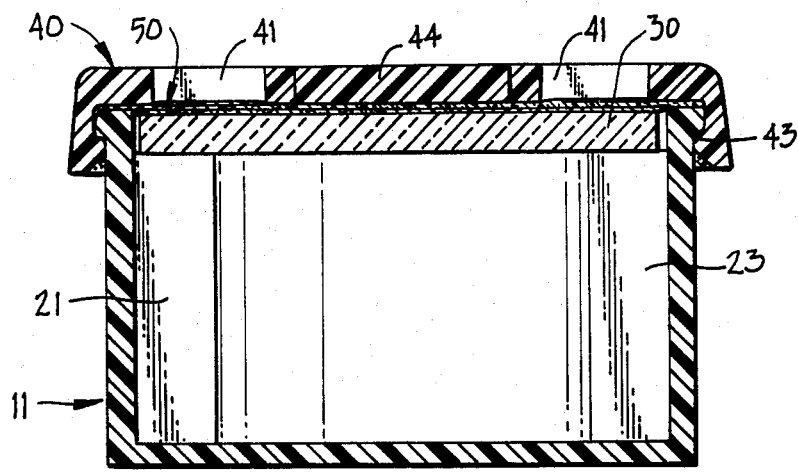
FIG. 2 is a sectional view of an assembled device taken along lines 2—2 of FIG. 1.
Figure 3:
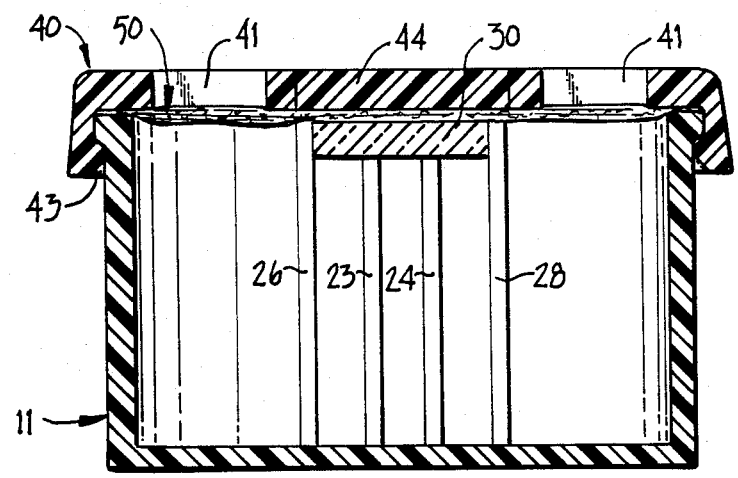
FIG. 3 is a sectional view taken along lines 3—3 of FIG. 1.

The detector shown in FIGS. 1–3 is designed to ensure registration in material 30 of tracks from the gas Rn 222 and the two alpha emitting radon daughter products Po 218 and Po 214. To maximize the probability that such alpha particles will be detected by the formation of a permanent damage track in material 30, the detector must be carefully dimensioned and a suitable track registration material 30 must be selected. The maximum linear path between a point on the inner surface of housing 11 and the lower surface of the track registration material 30 must be no greater than the maximum range of alpha particles from the above noted gas and daughter products. Of the three alpha emitting elements of interest, the alpha particle emitted by the spontaneous decay of Rn 222 has the shortest range in error, viz. 4.12 centimeters (the range of Po 218 is 4.67 centimeters, while the range of Po 214 is 6.91 centimeters. Thus, the maximum possible path length should be no greater than 4.12 centimeters) and, in fact should be chosen slightly less to ensure that an alpha particle emanating from Rn 222 at the lower corner of the housing interior volume reaches the lower surface of the track registration material 30 with sufficient energy to form a permanent damage track therein. With a maximum path length of slightly under 4.12 centimeters, the alpha particles from the other two constituents having longer ranges will also always reach the track registration material 30 when traveling along a linear path with sufficient energy to form a damage track therein, given the longer ranges of these alpha particles.

As noted above, consideration must also be given to the alpha sensitivity of the track registration material 30. The Rn 222 alpha particle is emitted with an energy of 5.49 MEV, the Po 218 alpha particle is emitted with an energy of 6.0 MEV and the Po 214 alpha particle is emitted with an energy of 7.69 MEV. Thus, the upper limit of the alpha sensitivity range of the track registration material 15 should be close to the energy of the Po 214 alpha particle, in the event that this element decays close to the track registration material 30. The lower limit of the alpha sensitivity range of the track registration material 30 should be close to 0 MEV. Since there are no known track registration materials which have a sensitivity that extends to absolute 0 MEV, the practical lower limit is about 0.1 MEV with presently available materials. At the upper limit, the practical limitation is approximately 8.0 MEV.

The central portion of cap 40 includes a solid portion 44 serving as a radiation absorber shield for the top surface of track registration material 30, which aids in determining the exposure surface (i.e. the lower surface) of track registration material 30 after emplacement, exposure and retrieval of the detector. Specifically, after removal of the track registration strip 30 and chemical treatment to enlarge the damage tracks formed by the alpha particles, the surface facing away from the exposure chamber (i.e. the top surface) is readily discernible by a central portion having very few damage tracks, on the order of radiation "noise." If desired, a visible indicia, such as a colored dot, may also be placed on the top surface as an additional aid in distinguishing the lower surface to be measured. As suggested by FIG. 1, a serial number may also be incorporated into the strip of track registration material 30, using either visible dyes, physical stamping, or the like.

In order to reduce to an absolute minimum the amount of radiation "noise" captured by the strip of track registration material 30, housing 11 and cap 40 are preferably fabricated from a material essentially devoid of any substances which emit alpha particles lying within the range of sensitivity of the registration material 30 (i.e. 0 to 8.0 MEV). The preferred material is pure polyethylene.

Figure 4:
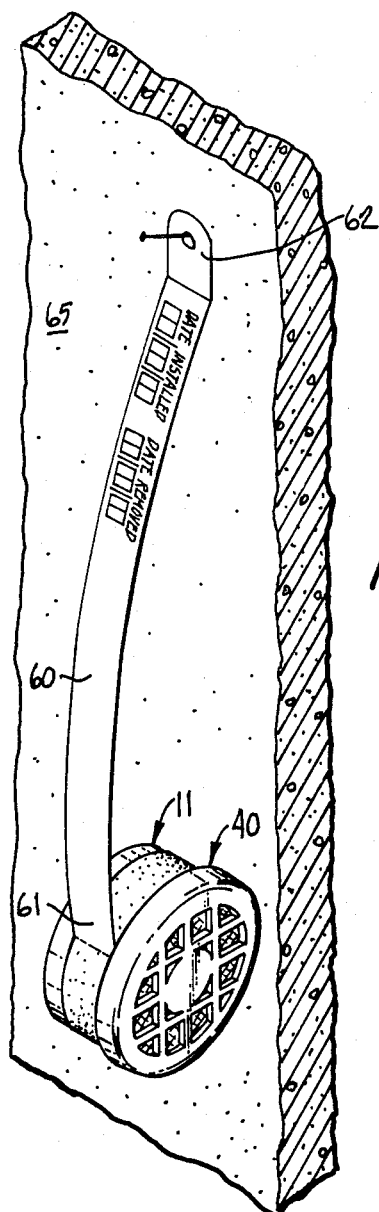
FIG. 4 is a perspective view illustrating placement of the detector for use in one application.

FIG. 4 illustrates a convenient emplacement/indicia feature of the invention. As seen in this FIG. a flexible strip of paper, plastic, or other similar material 60 is secured at one end 61 to the central periphery of the main housing 11, by any suitable means, such as an adhesive backing, a suitable glue, a staple or the like. During emplacement, such as on a wall 65 the free end 62 of flexible strip 60 can be tacked, nailed or pinned to the wall 65. During storage, or after removal from the wall 65, strip 60 is then wound about the central outer surface of main housing 11 and secured in place by means of adhesive tape or self adhesive backing. In order to provide the analyst with useful exposure information, strip 60 has sufficient surface area for the user to print or write in the pertinent information, such as the installation date, removal date, emplacement site or the like. If desired, return mailing information may also be placed on the flexible strip 60, so that the entire detector unit can serve as a self contained package for return to the analyzing laboratory.

Detectors fabricated according to the teachings of the invention provide a number of advantages heretofore absent from known alpha particle detectors. Firstly, such detectors can be used in virtually any application for track registration type detectors without sacrificing reliability in the data produced. In addition, the compact size of such detectors facilitates their use in structural survey applications and in personal dosimeter applications. In this connection, it is noted that the actual physical dimensions of the preferred embodiment of the detector are extremely small, the main housing 11 having a height of 0.75 inch and a maximum diameter across the flange 12 of 1.330 inches and the cap having a maximum diameter of 1.420 inch and a height of 0.20 inch. As will be apparent, such a compact unit may be inconspicuously placed on a living room wall, inserted into a shirt pocket of a miner without inconvenience, or placed down a drill hole for logging purposes. Further, the detector unit may be conveniently assembled without the necessity of any particular technical skill by simply placing the track registration strip 30 on the support ledges afforded by ribs 21-24, placing the filter sheet 50 over the mouth of the housing 11 and snap fitting apertured cover 40 on to the housing 11.

Once assembled, the unit is extremely rigid, due to the added strength of the support ribs 21-28, and the strip of track registration material 30 is firmly secured in place. Moreover, the snap fit afforded by the interference between cap lug 43 and the peripheral flange 12 is sufficiently stiff to resist the efforts of children to remove the cap and disturb the placement of the filter sheet 50 and strip of track registration material 30. Moreover, the flexible strip 60 affords a very convenient hanging strap for applications requiring the removable attachment of the detector to a structural member, such as a wall, and also serves the very useful purpose of providing a convenient self adhered data sheet serving to indicate the exposure history of the device.

While the above provides a full and complete disclosure of the invention, various modifications, alternate constructions and equivalents may be employed without departing from the spirit and scope of the invention. For example, while right circular cylindrical geometry has been illustrated for the housing 11, other geometrical configurations may be employed, as desired. Therefore, the above should not be construed as limiting the invention, which is defined by the appended claims.

What is claimed is:

1. An improved compact track registration detector for radon gas, said detector comprising:

a housing having an open mouth, a bottom and side walls defining an interior volume;

means for providing longitudinal and lateral support within said housing adjacent the inner side wall surfaces and said mouth;

track registration means supported in the interior of said housing by said support means, said track registration means having the property of forming damage tracks therein along paths traversed by alpha particles;

microporous filter means positioned across the mouth of said housing for preventing entry of radon daughters and particulate matter into said housing interior so that substantially only gases enter said volume; and an apertured cap removably received on the mouth end of said housing for retaining said filter means and said track registration means in place adjacent said mouth, said housing having internal wall surfaces dimensioned to optimize the registration of alpha particles from radon present in said housing interior and from radon daughter products present in said housing interior which are a result of the decay of radon gas admitted through said filter means into said housing interior.

2. The invention of claim 1 wherein said support means comprises a first plurality of upstanding ribs each terminating in an upper support surface and a second pluraltiy of upstanding ribs flanking said first plurality of ribs and each terminating in an upper surface located above said upper support surface.

3. The invention of claim 2 wherein said ribs are integrally formed with said housing.

4. The invention of claim 1 wherein said apertured cap includes a solid central portion providing a radiation shield for the top surface of said track registration material to enable the exposed bottom surface of said track registration material to be easily distinguished after exposure.

5. The invention of claim 1 wherein said housing is fabricated from a material substantially devoid of alpha emitting substances.

6. The invention of claim 5 wherein said housing material is polyethylene.

7. The invention of claim 1 wherein said filter means comprises a water repellent embossed laminate of microporous polypropylene material having a pore volume of about forty-five percent with pore sizes of about 0.04 by about 0.20 micrometer and a thickness of about 200 micrometers.

8. The invention of claim 1 wherein said track registration material comprises a strip of solid material having an alpha particle sensitivity range with an upper limit of about 8 MEV.

9. The invention of claim 8 wherein said material has an alpha particle sensitivity range with a lower limit of about 0.1 MEV.

10. A compact track registration detector for radon gas, said detector comprising:

a housing having a removable closure cap for retaining a strip of track registration material having the property of forming damage tracks therein along paths traversed by alpha particles;

a microporous filter means for preventing entry into the interior of said housing of radon daughters and particulate matter so that substantially only gases enter the interior volume of said housing; and a flexible mounting/indicia strip normally wrapped about the exterior of said housing for enabling said detector to be removably attached to a mounting surface, said strip having surface regions arranged to enable predetermined information to be recorded thereon serving to identify predetermined exposure information.

11. The invention of claim 10 wherein said housing has an open mouth, a bottom and side walls defining said interior volume, and means for providing longitudinal and lateral support in said interior volume adjacent the inner side wall surfaces.

12. The invention of claim 11 wherein said support means comprises a first plurality of upstanding ribs each terminating in an upper support surface and a second plurality of upstanding ribs flanking said first plurality of ribs and each terminating in an upper surface located above said upper support surface.

13. The invention of claim 12 wherein said ribs are integrally formed with said housing.

14. The invention of claim 10 wherein said enclosure cap includes a solid central portion providing a radiation shield for the top surface of said track registration material to enable the exposed bottom surface of said track registration material to be easily distinguished after exposure.

15. The invention of claim 10 wherein said housing is fabricated from a material substantially devoid of alpha emitting substances.

16. The invention of claim 15 wherein said housing material is polyethylene.

17. The invention of claim 10 wherein said filter means comprises a water repellent embossed laminate of microporous polypropylene material having a pore volume of about forty-five percent, with pore sizes of about 0.04 by about 0.20 micrometer and a thickness of about 200 micrometers.

18. The invention of claim 10 wherein said track registration material comprises a strip of solid material having an alpha particle sensitivity range with an upper limit of about 8 MEV.

19. The invention of claim 18 wherein said track registration material has an alpha particle sensitivity range with a lower limit of about 0.1 MEV.

* * * * *

UNITED STATES PATENT AND TRADEMARK OFFICE
CERTIFICATE OF CORRECTION

PATENT NO. : 4,518,860
DATED : May 21, 1985
INVENTOR(S) : H. Ward Alter, Richard A. Oswald It is certified that error appears in the above—identified patent and that said Letters Patent is hereby corrected as shown below:

In column 5, line 14 cancel "error" and insert --air--.

Signed and Sealed this

Twenty-second Day of April 1986

[SEAL]

Attest:

DONALD J. QUIGG

*Attesting Officer*     *Commissioner of Patents and Trademarks*